(12) United States Patent  
Nguyen et al.

(10) Patent No.: US 7,174,414 B2  
(45) Date of Patent: Feb. 6, 2007

(54) METHOD AND APPARATUS MAPPING LOGICAL TRACKS IN A DISK DRIVE FOR OPTIMIZING TRACK SEEK TIME

(75) Inventors: Tung Nguyen, San Jose, CA (US); Bipin V. Gami, Northridge, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 376 days.

(21) Appl. No.: 10/745,709

(22) Filed: Dec. 23, 2003

(65) Prior Publication Data

US 2005/0138265 A1 Jun. 23, 2005

(51) Int. Cl.
*G06F 12/00* (2006.01)
(52) U.S. Cl. .............................. 711/4; 711/112; 711/203
(58) Field of Classification Search .................... 711/4, 711/112, 203
See application file for complete search history.

(56) References Cited

U.S. PATENT DOCUMENTS

| 5,446,718 A * | 8/1995 | Shimizu et al. .......... 369/59.26 |
| 6,775,090 B2 * | 8/2004 | DuLaney et al. ........ 360/77.02 |
| 2004/0193798 A1 * | 9/2004 | Kuwamura ................. 711/114 |
| 2005/0078566 A1 * | 4/2005 | Wilson et al. ........... 369/13.35 |

* cited by examiner

*Primary Examiner*—Hiep T. Nguyen
(74) *Attorney, Agent, or Firm*—GSS Law Group; Earle Jennings

(57) ABSTRACT

A method of mapping logical track numbers to a collection of physical tracks on at least two disk surfaces within a disk drive. The method further includes accessing logical tracks at assigned physical tracks. The invention includes making disk drives using the mapping of logical tracks to physical tracks and those disk drives as a product of that manufacturing process. The invention also includes program systems implementing the mapping of logical tracks to physical tracks within the disk drive and disk drives implementing the method of assigning logical tracks to physical tracks and/or accessing logical tracks based upon the physical track assignment.

21 Claims, 11 Drawing Sheets

METHOD AND APPARATUS MAPPING LOGICAL TRACKS IN A DISK DRIVE FOR OPTIMIZING TRACK SEEK TIME

TECHNICAL FIELD

This invention relates to the mapping of the logical tracks to the physical tracks in a disk drive, the mechanical alignment of read-write heads to physical tracks in a disk drive, and the effect of track mapping to track seek time given the mechanical alignment.

BACKGROUND ART

Disk drives place data in physical tracks based upon their logical track number. All access of this data occurs based upon the logical track number. Traditionally, disk drives with multiple read-write heads access successive data tracks, on their respective disk surfaces as illustrated in FIG. 2F. This mapping of logical track numbers to physical tracks is based upon a perception of how the read-write heads mechanically align to each other illustrated in FIG. 2E.

As Tracks Per Inch (TPI) in disk drives increase mechanical misalignments between these read-write heads have a significant impact on track seek time. These previously minor mechanical misalignments fail to match the perception illustrated in FIG. 2E, and lead to significant track seek time inefficiencies with the mapping scheme illustrated in FIG. 2F.

FIG. 1A illustrates a typical prior art high capacity disk drive 10 including actuator arm 30 with voice coil 32, actuator axis 40, actuator arms 50–58 and with head gimbal assembly 60 placed among the disks.

FIG. 1B illustrates a typical prior art, high capacity disk drive 10 with actuator 20 including actuator arm 30 with voice coil 32, actuator axis 40, actuator arms 50–56 and head gimbal assembly 60–66.

FIG. 2A illustrates a suspended head gimbal assembly 60 containing the MR read-write head 200 of the prior art.

Voice coil actuators including 20–66 are used to position read-write heads over specific tracks. The heads are mounted on head gimbal assemblies 60–66, which float a small distance off the disk drive surface when in operation. The air bearing is formed by the rotating disk surface 12, as illustrated in FIGS. 1A–1B, and slider head gimbal assembly 60, as illustrated in FIGS. 1A–2A.

Often there is one head per head slider for a given disk drive surface. There are usually multiple heads in a single disk drive, but for economic reasons, usually only one voice coil actuator.

Voice coil actuators are further composed of a fixed magnet actuator 20, interacting with a time varying electromagnetic field induced by voice coil 32, to provide a lever action via actuator axis 40. The lever action acts to move actuator arms 50–56 positioning head gimbal assemblies 60–66 over specific tracks with speed and accuracy. Actuators 30 are often considered to include voice coil 32, actuator axis 40, actuator arms 50–56 and head gimbal assemblies 60–66. An actuator 30 may have as few as one actuator arm 50. A single actuator arm 52 may connect with two head gimbal assemblies 62 and 64, each with at least one head slider.

Head gimbal assemblies 60–66 are typically made by rigidly attaching a slider 100 to a head suspension, including a flexure providing electrical interconnection between the read-write head in the slider and the disk controller circuitry. FIG. 2B illustrates the relationship between the principal axis 110 of an actuator arm 50 containing head gimbal assembly 60, which in turn contains slider 100, with respect to a radial vector 112 from the center of rotation of spindle hub 80 as found in the prior art.

The actuator arm assembly 50-60-100, pivots about actuator axis 40, changing the angular relationship between the radial vector 112 and the actuator principal axis 110. The farthest inside position is the Inside Position (ID). The position where radial vector 112 approximately makes a right angle with 110 is the Middle Position(MD). The farthest out position where the read-write head 100 accesses disk surface 12 is the Outside Position(OD). Crash Stop 90 is located near the Outside Diameter OD, and is discussed in FIG. 2D.

FIG. 2C illustrates a simplified schematic of a disk drive controller 1000 of the prior art, used to control an assembled disk drive 10.

Disk drive controller 1000 controls an analog read-write interface 220 communicating resistivity found in the spin valve within read-write head 200.

Analog read-write interface 220 frequently includes a channel interface 222 communicating with pre-amplifier 224. Channel interface 222 receives commands, from embedded disk controller 100, setting at least the read_bias and write_bias.

Various disk drive analog read-write interfaces 220 may employ either a read current bias or a read voltage bias. By way of example, the resistance of the read-write head is determined by measuring the voltage drop (V_rd) across the read differential signal pair (r+ and r−) based upon the read bias current setting read_bias, using Ohm's Law.

In FIG. 2C, channel interface 222 also provides a Position Error Signal PES to at least servo controller 240 may include a control feedback loop. The PES signal is used by servo controller 240 to control voice coil 32 to keep read-write head 200 close enough to a physical track 120 of FIG. 2B to support read-write head 200 communicatively accessing physical track 120.

FIG. 2D illustrates the prior art single level inertial latch mechanism including latch arm 230 pivoting about 232 and including latch hook 234, mechanically fitting with actuator catch mechanism 236, as well as latch stop 240, and crash stop 90, with the latch mechanism at rest. Note that actuator 30 abuts crash stop 90 and that inertial latch arm 230 abuts latch stop 240 when the single-lever inertial latch is at rest. Head gimbal assembly 60 is in position on parking ramp 250.

Each physical track, contains a successive graycode. The track under the crash stop 90 illustrated in FIGS. 2B and 2D, is also the Outside Diameter (OD), and has graycode number 0. Successive graycodes differ by exactly one bit. This is known as a hamming distance of one. A hamming distance of two indicates that two graycodes differ in exactly two bits.

FIG. 2E illustrates the prior art relationship between the read-write heads 200–0 to 200–3 and the tracks they access on the disk surfaces 12–18.

FIG. 2F illustrates the prior art logical track mapping to physical tracks. Until recently, tracks were far enough apart that the mechanical misalignment of read-write heads 200–0 to 200–3 as illustrated in FIG. 2E was negligible. The optimal mapping scheme for logical tracks to physical tracks in this situation is to have successive tracks on different head when possible as illustrated in FIG. 2F. This reduces the track seek problem to seeking within a fraction of a track width.

However, the inventors discovered that this situation is changing. As the TPI increases, the scenario illustrated in FIG. 2E no longer applies. As a consequence, the use of the mapping scheme for logical tracks of FIG. 2F is no longer optimal. What is needed is a new understanding of the relationship between read-write heads and tracks on disk surfaces, and better mapping schemes for logical tracks, which reflect the observed realities of contemporary and future high TPI disk drives. What is needed are methods of allocating logical tracks to physical tracks based upon these new insights.

SUMMARY OF THE INVENTION

The invention includes a method of mapping logical track numbers to a collection of physical tracks on at least two disk surfaces within a disk drive. For each of the disk surfaces, each of the physical tracks on the disk surface contains a unique graycode. For each of the disk surfaces, whenever two of the physical tracks are physically neighbors, the hamming distance between the graycodes of the two physical tracks is one.

The method includes the following. Determining a graycode offset for a head accessing the disk surface, for each of the disk surfaces within the disk drive. Successively assigning consecutive logical tracks at successive physical tracks, starting at the graycode offset for the head accessing the disk surface, successively for each of the disk surfaces.

This method advantageously maps logical tracks very close to their nearest physical track, so that the accessing head is within one half a physical track width.

The method further includes accessing logical tracks at the assigned physical tracks.

The invention also includes making disk drives using the mapping of logical tracks to physical tracks. The invention includes those disk drives as a product of that manufacturing process. The lowered distance between the logical track and the actual location of the assigned physical track improves track seek time in many situations.

The invention also includes program systems implementing the mapping of logical tracks to physical tracks within the disk drive.

The invention includes disk drives implementing the method of assigning logical tracks to physical tracks and/or accessing logical tracks based upon the physical track assignment.

These and other advantages of the present invention will become apparent upon reading the following detailed descriptions and studying the various figures of the drawings.

DETAILED DESCRIPTION OF THE INVENTION

The invention includes a method of mapping logical track numbers to a collection of physical tracks on at least two disk surfaces within a disk drive. For each of the disk surfaces, each of the physical tracks on the disk surface contains a unique graycode. For each of the disk surfaces, whenever two of the physical tracks are physical neighbors, the hamming distance between the graycodes of the two physical tracks is one.

Figure 3A:
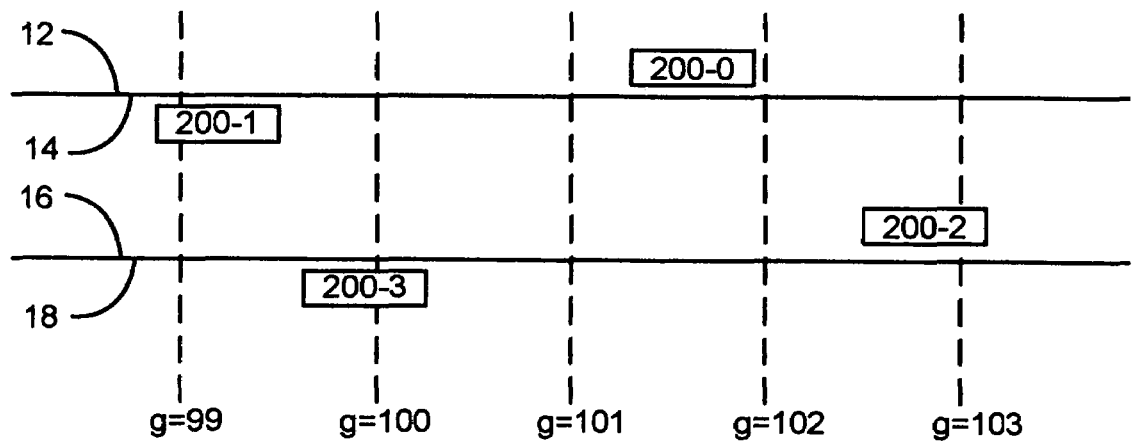
FIG. 3A illustrates read-write heads aligning to specific physical tracks on disk surfaces in a disk drive with high TPI.

FIG. 3A illustrates what the inventors have discovered about the emerging situation regarding read-write heads 200–0 to 200–3 aligning to specific physical tracks g on the disk surfaces 12–18 in a disk drive with high TPI. Each read-write head is often slightly out of mechanical alignment with the other read-write heads. In the past, widely separated tracks hid these misalignments. However, the inventors discovered that this was not the case anymore. As the TPI increases, this misalignment will grow in effect.

Figure 3B:
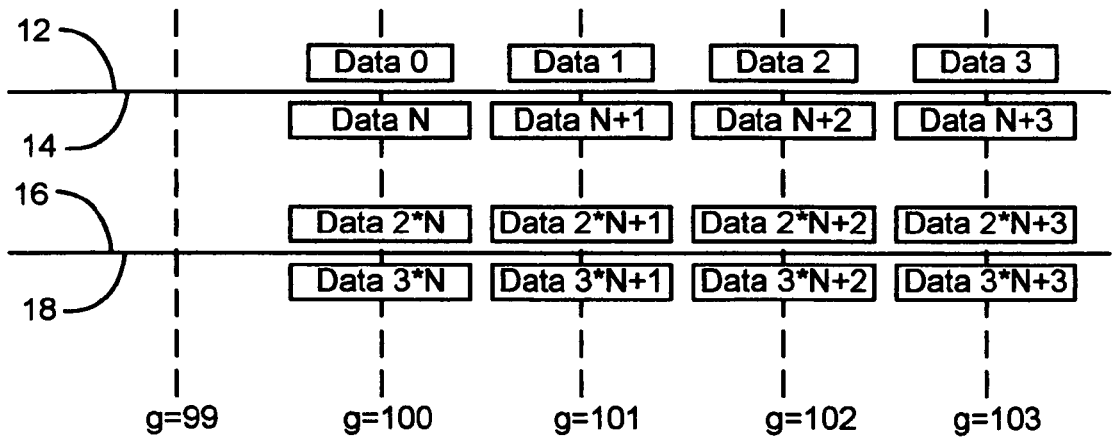
FIG. 3B illustrates a first preferred method for aligning read-write heads to physical tracks.

A method of assigning logical track numbers to physical track graycodes is illustrated in FIG. 3B. Consecutive logical track numbers are assigned at successive physical tracks starting at a fixed graycode offset for the read-write head accessing the disk surface. This creates an assigned physical track for the logical track number, successively for each of the disk surfaces. The fixed graycode offset is g=100, chosen for illustrative purposes.

As shown in FIG. 3B, N may be the number of tracks in a zone of tracks on each disk surface of the disk drive. This will be referred to as a "serpentine" mapping scheme. Alternatively, N may be the number of physical tracks on each disk surface to be used. N may vary from one disk surface to another, or be the same for all disk surfaces within the disk drive. Consecutive logical tracks are usually within one physical track of each other, minimizing track seek time in such cases.

The mapping schemes of FIG. 3B have a problem, truly random access of logical tracks will encounter the fact that the assigned physical track may be several physical tracks away from the read-write head 200. The logical track may not be where it is supposed to be, due to read-write head misalignment illustrated in FIG. 3A. The read-write heads 200-0 to 200-3 may not be over the same physical tracks when accessing their respective disk surfaces as FIG. 3A illustrates.

Figure 3C:
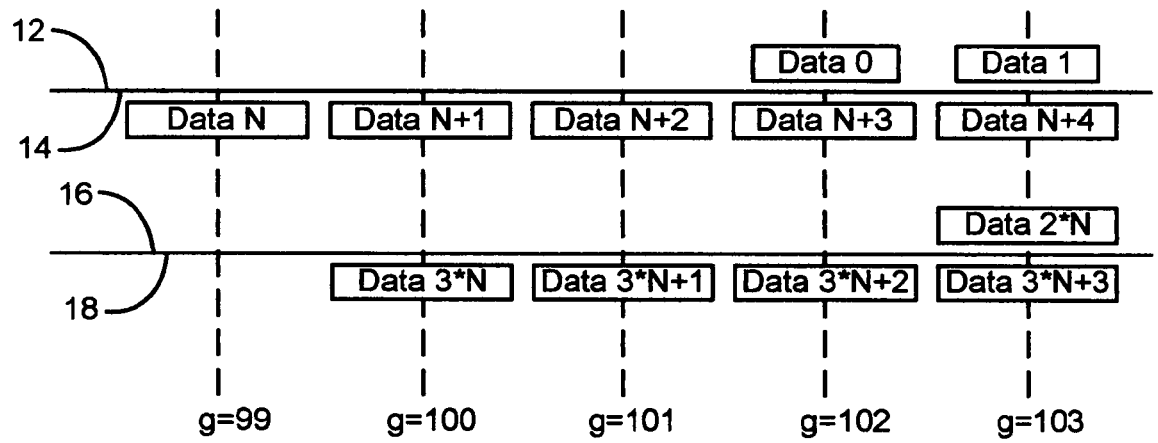
FIG. 3C illustrates an improved scheme for mapping logical track numbers to physical tracks.

FIG. 3C illustrates an improved scheme for mapping logical track numbers to physical tracks of FIG. 3B, in keeping with FIG. 3A. It shows the result of successively assigning consecutive logical track numbers at successive physical tracks, starting at the graycode offset for the read-write head accessing the disk surface, to create an assigned physical track for the logical track number, successively for each of the disk surfaces.

Figure 3D:
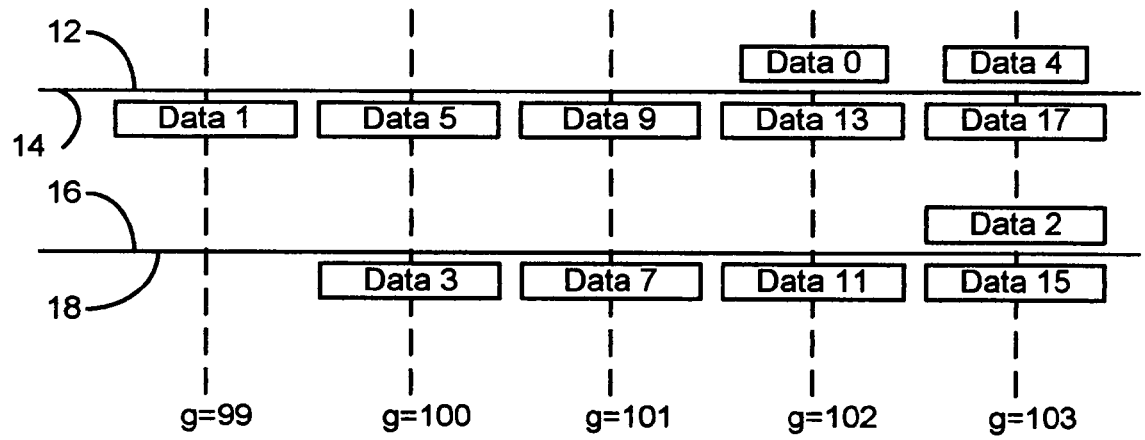
FIG. 3D illustrates an improved mapping scheme that combines successive read-write heads accessing successive logical tracks with the realities of read-write head alignment.

FIG. 3D illustrates an improved mapping scheme discovered by the inventors which combines the advantages of the successive read-write heads accessing successive logical tracks, with the realities of read-write head alignment as illustrated in FIG. 3A.

When a disk drive accesses a succession of logical tracks in a fashion similar to the benchmark test Winbench, the data being accessed is stored in relatively small records. The serpentine method illustrated in FIGS. 3B and 3C may well see many short track seek distances, on the order of 20 to 100 tracks.

A disk drive with four read-write heads implementing the method illustrated in FIG. 3D will experience seek distances typically one quarter of the track seek distances compared to the other approaches. A disk drive with two read-write heads implementing the method illustrated in FIG. 3D will experience one half of those track seek distances.

Figure 1A:
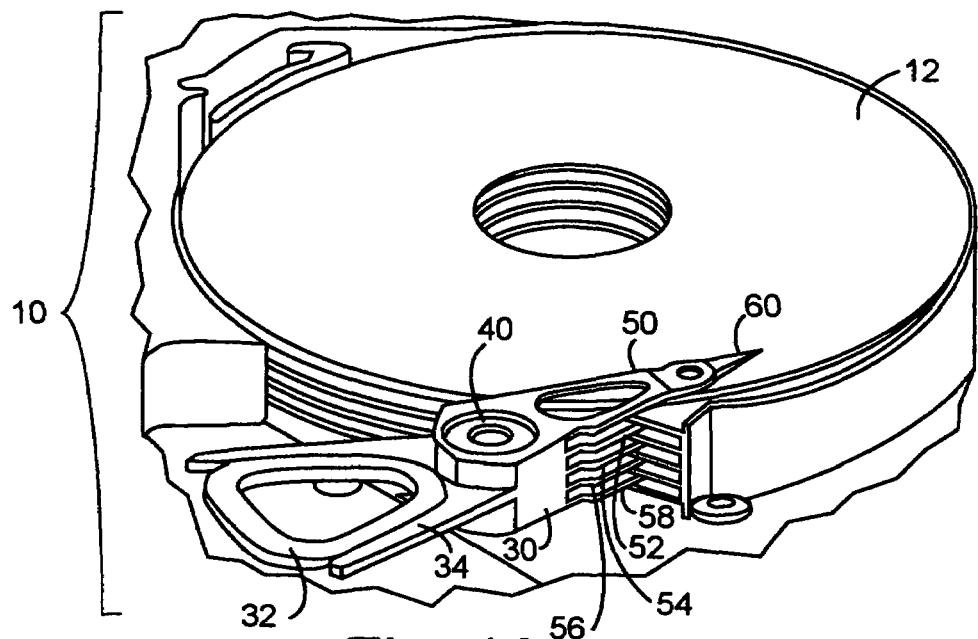
FIG. 1A is a fragmentary view of a prior art, disk drive.
Figure 1B:
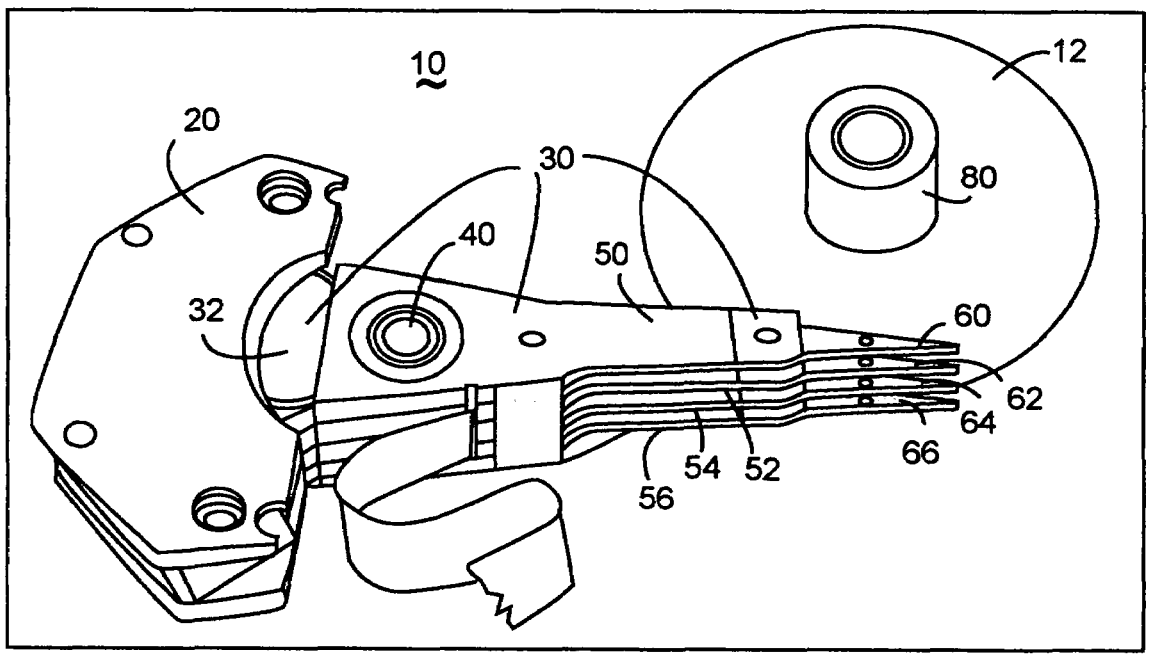
FIG. 1B is a schematic view of a typical prior art, high capacity disk drive.
Figure 2A:
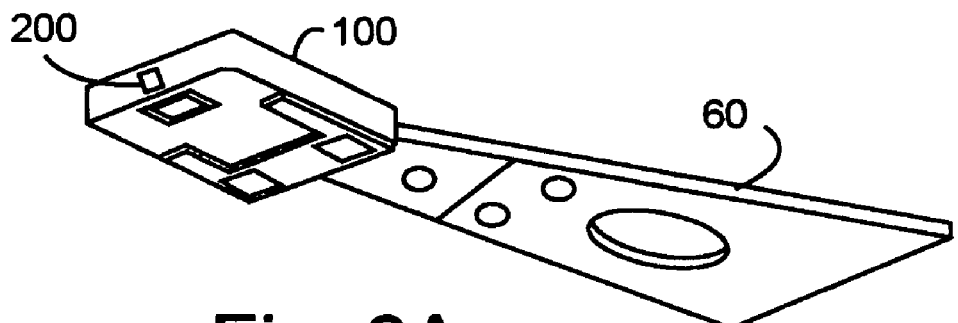
FIG. 2A is a prior art head gimbal assembly.
Figure 2B:
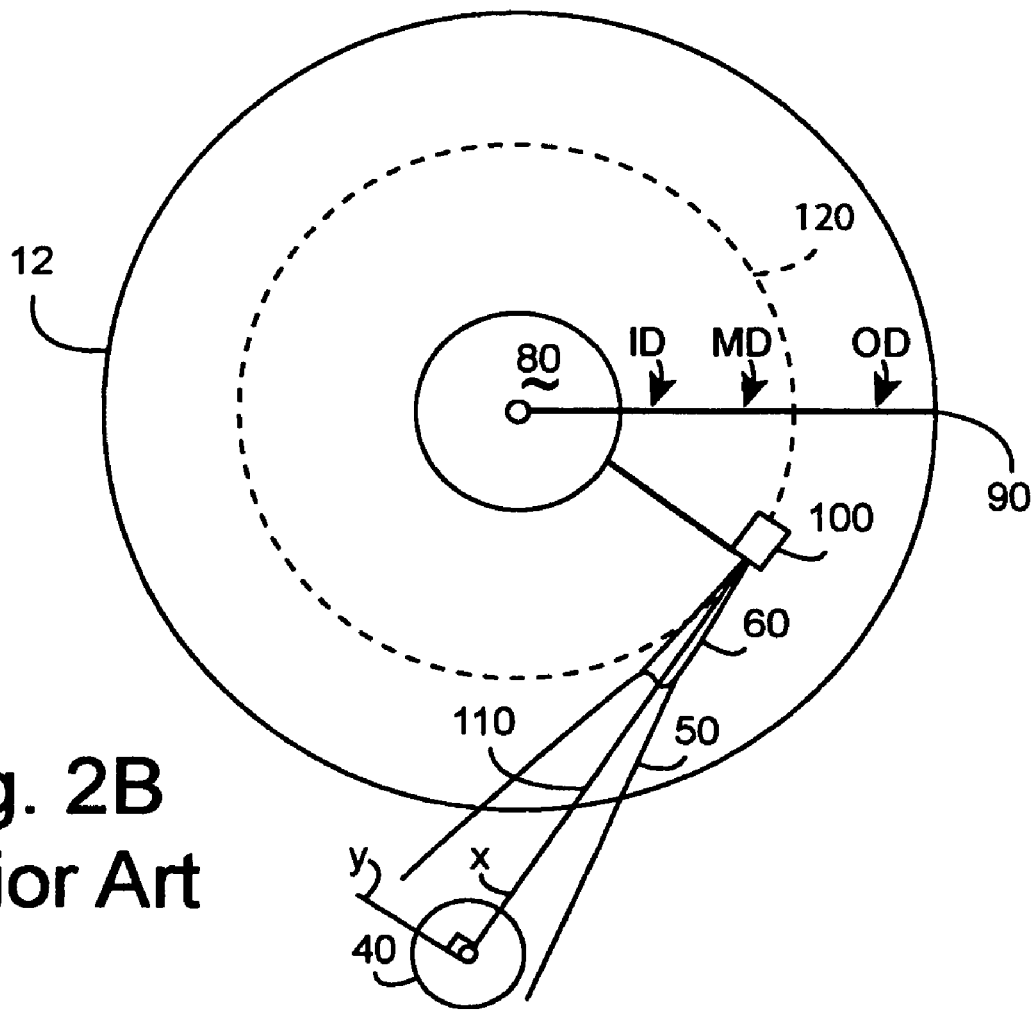
FIG. 2B is a schematic view showing a prior art head gimbal assembly with respect to a rotating disk.
Figure 2C:
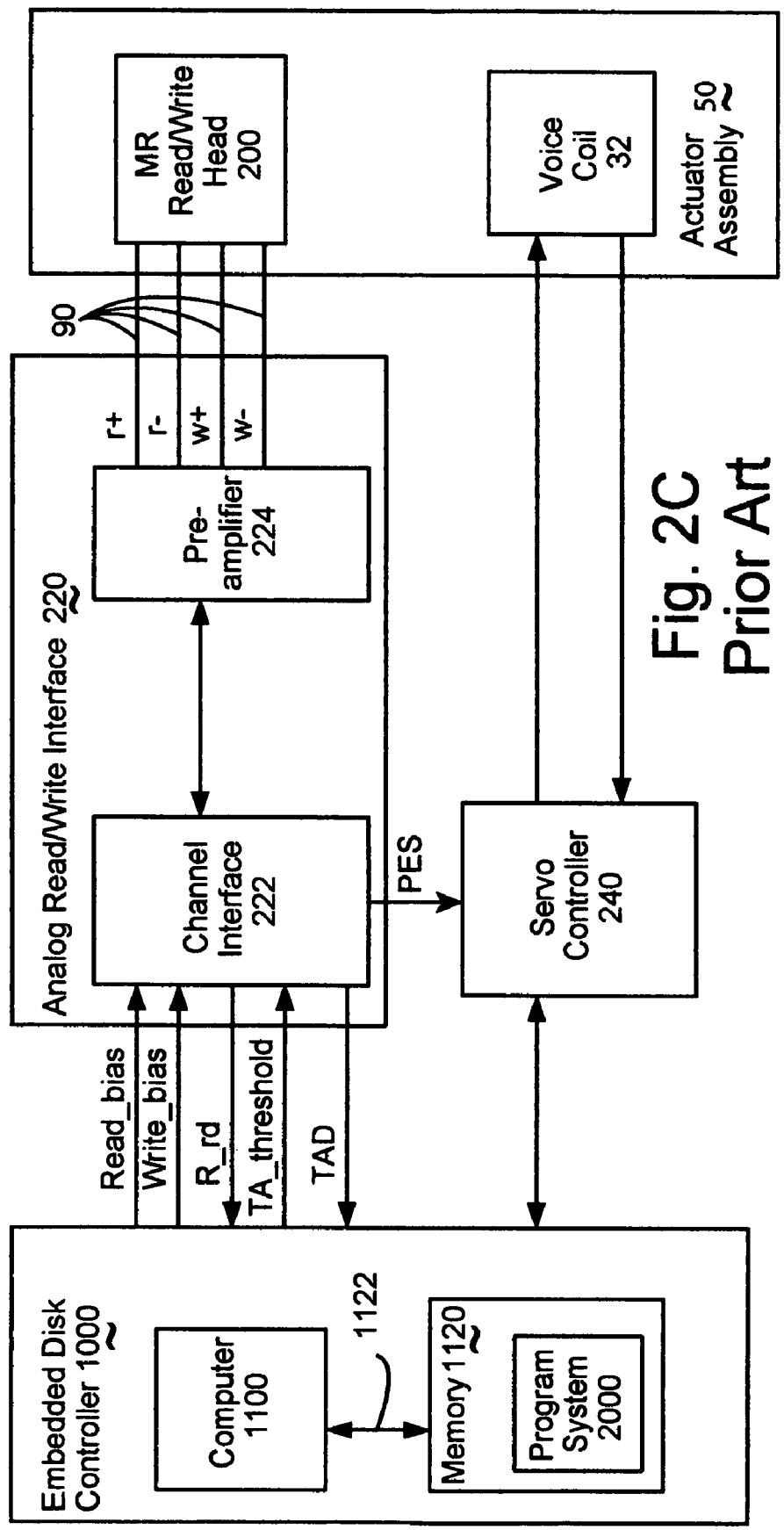
FIG. 2C is a simplified schematic of a prior art disk drive controller.
Figure 2D:
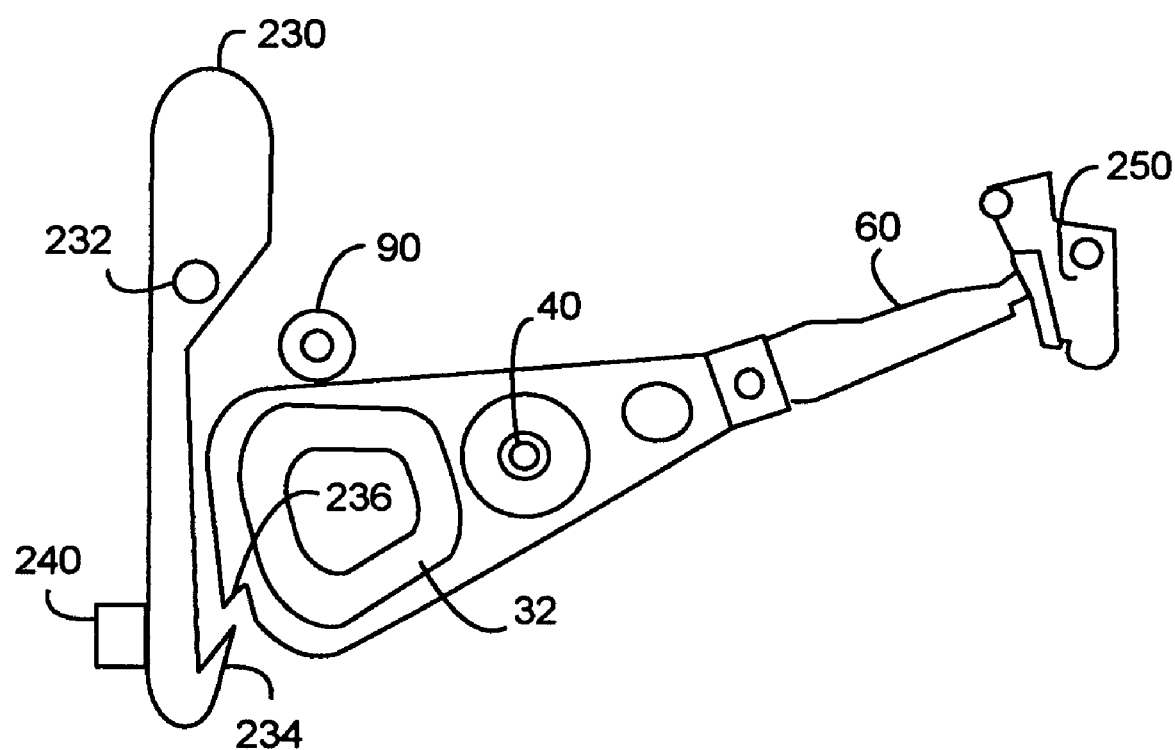
FIG. 2D illustrates the prior art single level inertial latch mechanism.
Figure 2E:
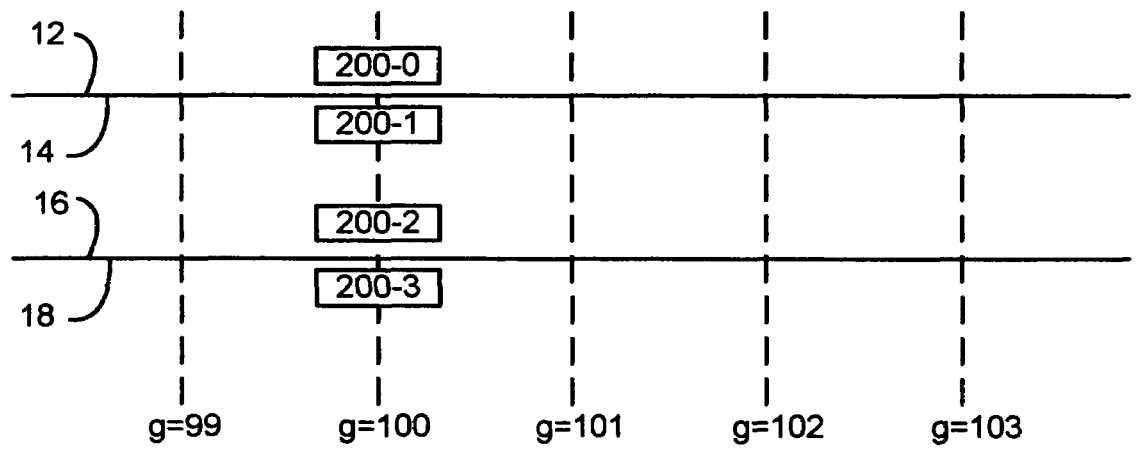
FIG. 2E illustrates the prior art relationship between read-write heads and the tracks they access.
Figure 2F:
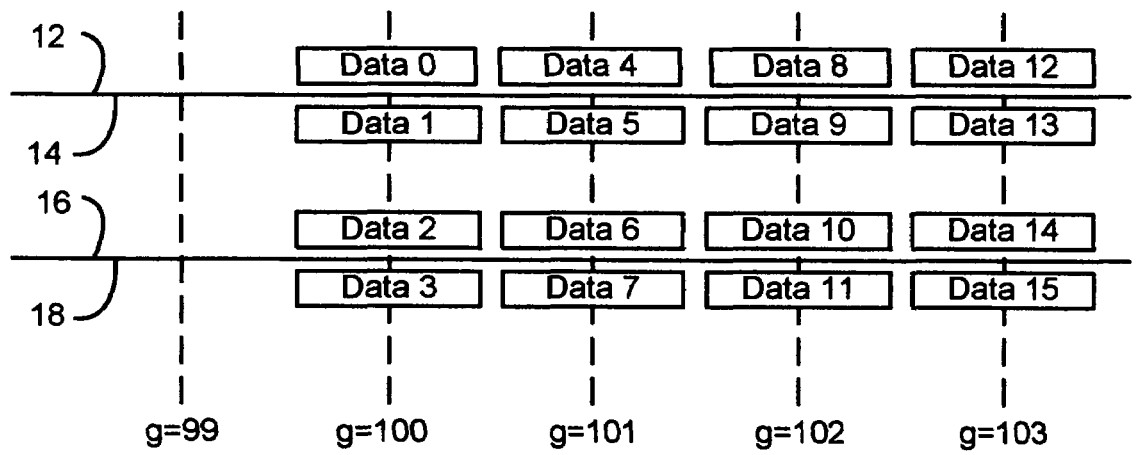
FIG. 2F illustrates the prior art logical track mapping to physical tracks.

The invented methods of mapping logical track numbers to physical tracks, may be implemented, as shown in FIG. 2C, by a computer 1100 controlled by a program system 2000 including program steps residing in a memory 1120 accessibly coupled 1122 with the computer. Computer 1100 is one of many means for implementing the methods presented herein. This approach to discussing the inventive method is taken to simplify the discussion, and is not meant to limit the scope of the claims.

The following figures illustrate flowcharts of at least one method possessing arrows with reference numbers. These arrows will signify flow of control, and sometimes data, supporting implementations including at least one program step, or program thread, executing upon a computer, inferential links in an inferential engine, state transitions in a finite state machine, and dominant learned responses within a neural network.

The process block of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The process block of termination in a flowchart refers to at least one or more of the following. The completion of those process blocks, which may result in a subroutine return, traversal of a higher node in an inferential graph, popping of a previously stored state in a finite state machine, or return to dormancy of the firing neurons of the neural network.

A computer as used herein will include, but is not limited to an instruction processor. The instruction processor includes at least one instruction processing element and at least one data processing element, each data processing element is controlled by at least one instruction processing element.

For each disk surface, each physical track on the disk surface contains a unique graycode.

Whenever two physical tracks are physically neighbors, the hamming distance between the graycodes of the two physical tracks is one.

Figure 4:
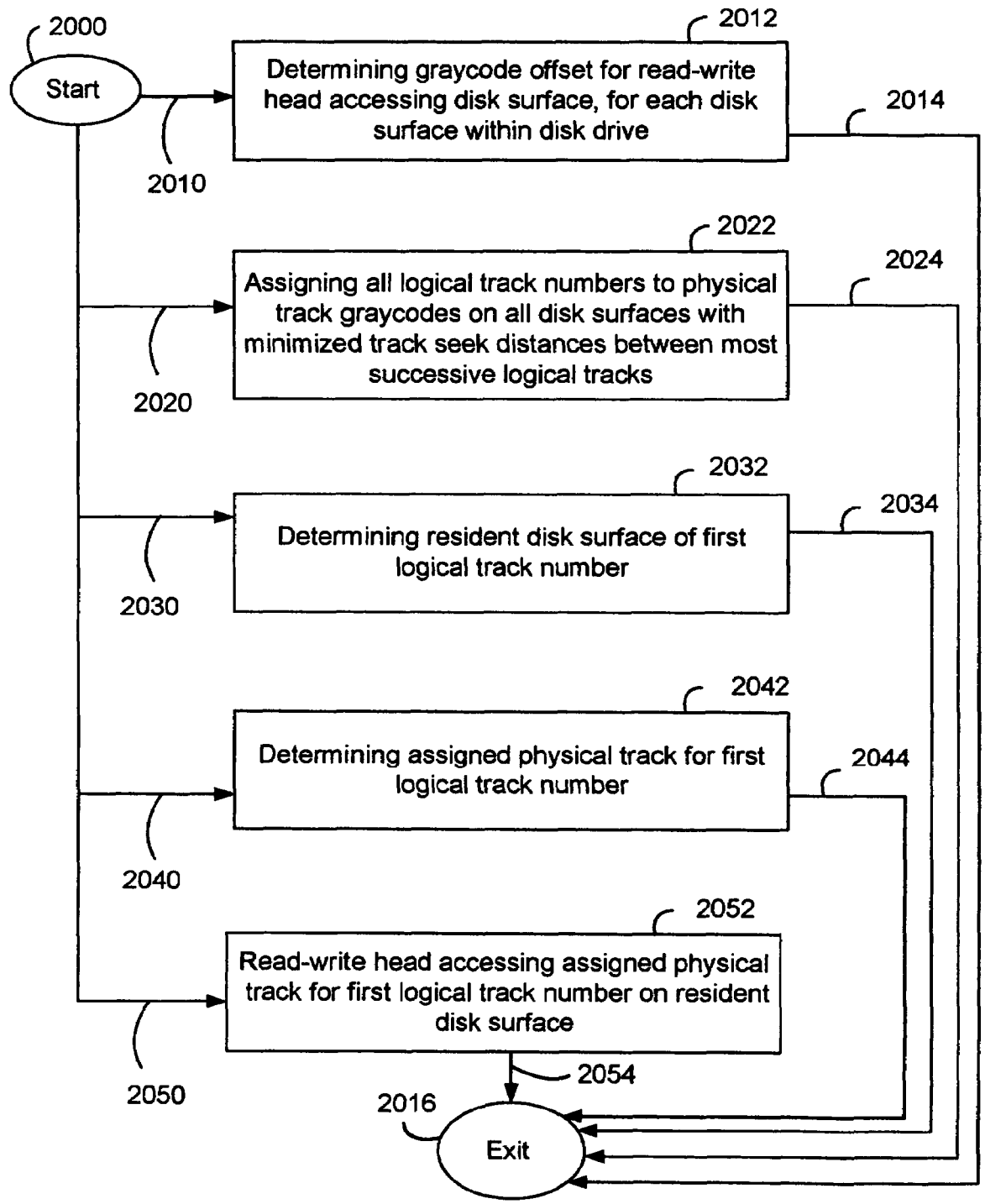
FIG. 4 illustrates a flowchart of a preferred embodiment of either method of assigning logical track numbers to physical tracks and then using an assignment.

FIG. 4 illustrates a detail flowchart of program system 2000 of FIG. 2C implementing either method of assigning logical track numbers to physical tracks and then using that assignment as illustrated in FIGS. 3B to 3D.

In FIG. 4, process block 2012 determines a graycode offset for a read-write head accessing the disk surface, for each of the disk surfaces within the disk drive. In the mapping methods of FIGS. 3B and 3C, this process block uses a predetermined graycode offset constant as the graycode offset for each disk surface.

Figure 6A:
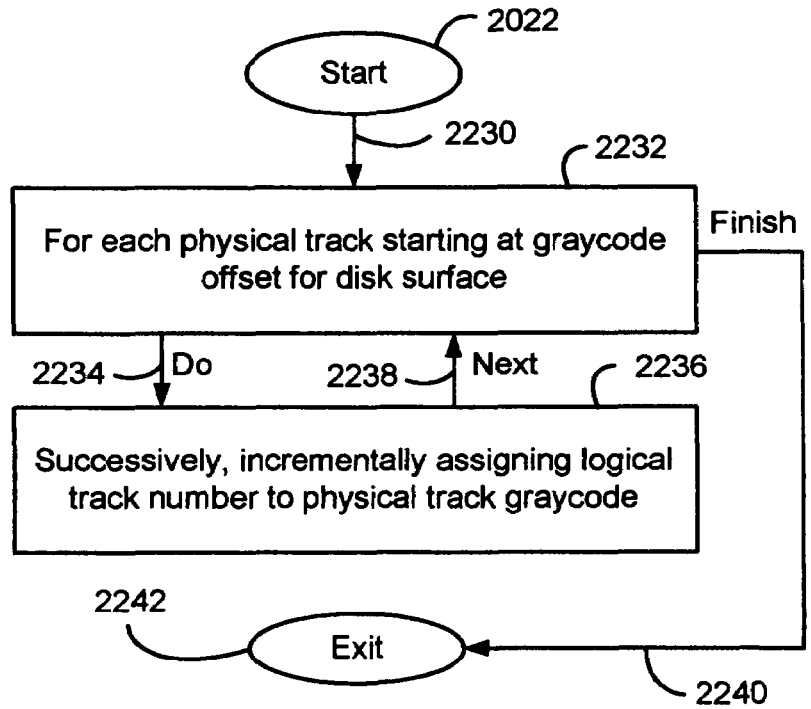
FIGS. 6A and 6B are flowcharts successively assigning consecutive logical track numbers to the physical tracks on the disk surface.
Figure 6B:
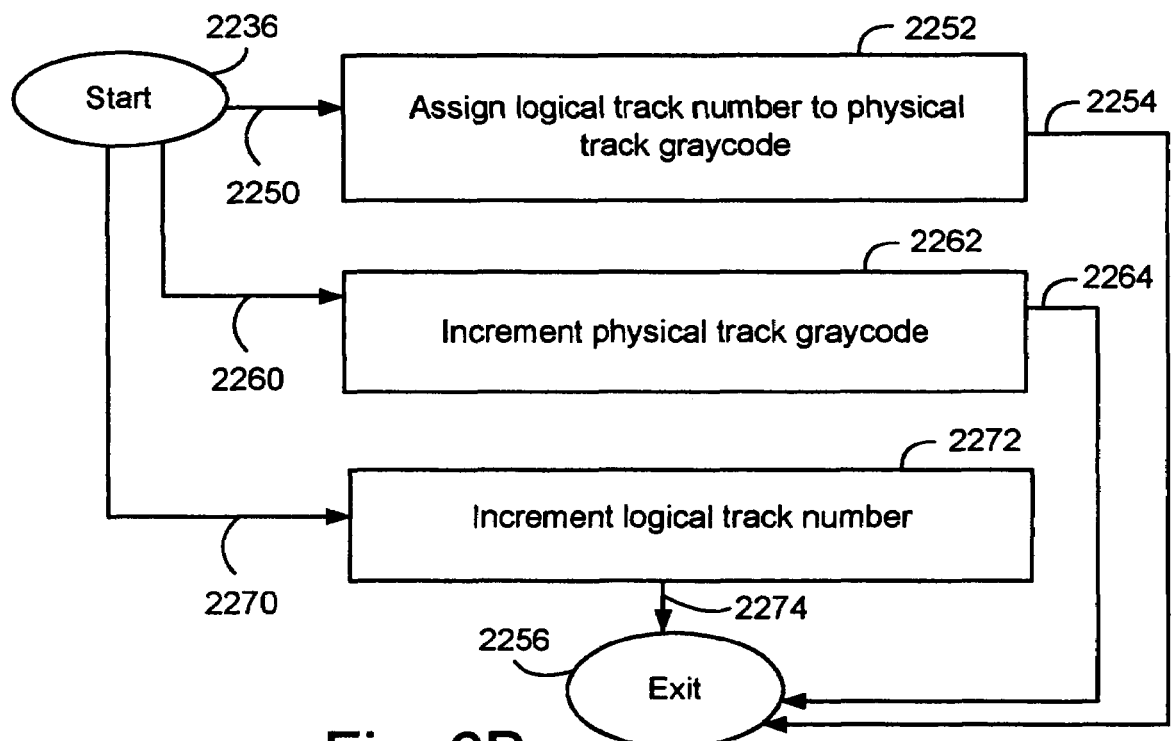

Process block 2022 successively assigns consecutive logical track numbers to successive physical tracks, starting at the graycode offset for the read-write head accessing the disk surface, for each of the disk surfaces, further illustrated in FIGS. 6A and 6B. Particularly with regards to FIG. 3D, process block 2022 successively assigns the logical track numbers successively for each of the disk surfaces starting at the graycode offset for the read-write head accessing the disk surface, further illustrated in FIGS. 8A and 8B.

Process block 2032 determines a resident disk surface of a first of the logical track numbers. Process block 2042 determines the assigned physical track for the first logical track number. Process block 2052 performs the read-write head accessing of the assigned physical track for the first logical track number on the resident disk surface.

Figure 5A:
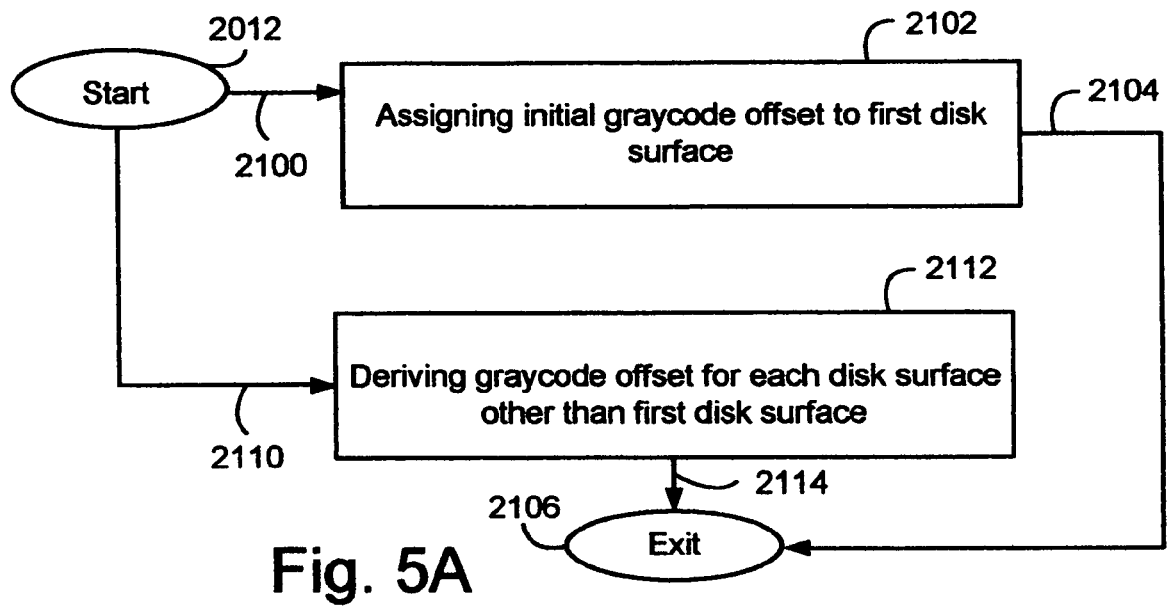
FIG. 5A illustrates a flowchart determining the graycode offset for the invention.

FIG. 5A illustrates process block 2012 of FIG. 4 in keeping with the graycode offset FIG. 3A. Process block 2102 assigns an initial graycode offset to a first disk surface. Process block 2112 derives the graycode offset for each disk surface other than the first disk surface.

Figure 5B:
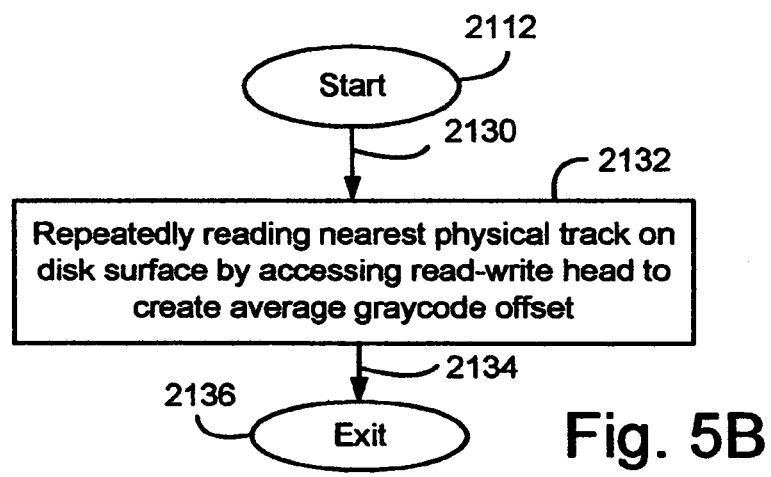
FIGS. 5B and 5C are flowcharts deriving the graycode offset.

FIG. 5B illustrates process block 2112 of FIG. 5A. Process block 2132 repeatedly reads a nearest physical track on the disk surface, by the read-write head accessing the disk surface to create an average graycode offset for the disk surface. The average graycode offset at least partially determines the graycode offset for the disk surface, for each disk surface other than the first disk surface.

Process block 2132 is preferably performed when the disk drive ambient temperature is within the disk drive's nominal operating temperature range.

Figure 5C:
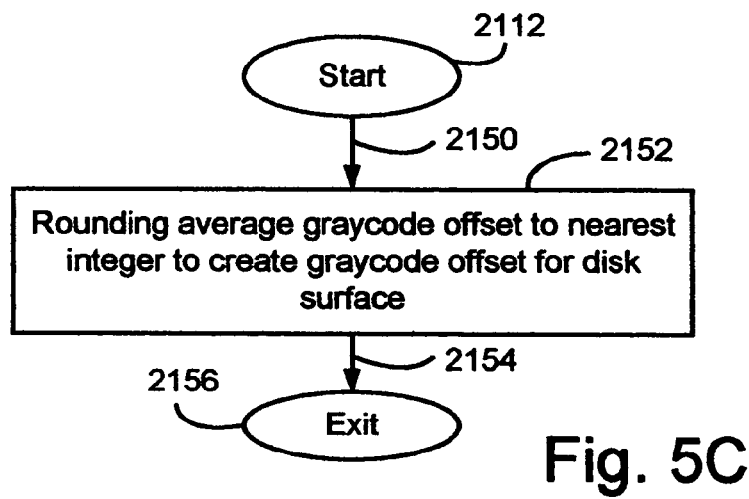

FIG. 5C illustrates process block 2112 of FIG. 5A. Process block 2152 performs rounds the average graycode offset to the nearest integer to create the graycode offset for the disk surface.

FIG. 6A illustrates process block 2022 of FIG. 4. Process block 2232 controls performing process block 2236, for each physical track starting at the graycode offset for the disk surface. Process block 2236 is the body of the loop, performing successively, incrementally assigning the logical track number to the physical track graycode.

FIG. 6B illustrates process block 2236 of FIG. 6A. Process block 2252 performs assigns the logical track number to the physical track graycode. Process block 2262 increments the physical track graycode. Process block 2272 increments the logical track number.

One skilled in the art will recognize that process blocks 2262 and 2272 take effect after the logical track number is assigned the physical track in process block 2252. There may be intervening process blocks performed and the execution order of these process blocks 2262 and 2272 may vary.

All of the physical tracks of at least one of the disk surfaces may preferably consist essentially of a maintenance track collection and a user track collection. The maintenance track and user track collections share no members. The maintenance track collection includes at least one, and the user track collection includes at least two, physical tracks.

Figure 7A:
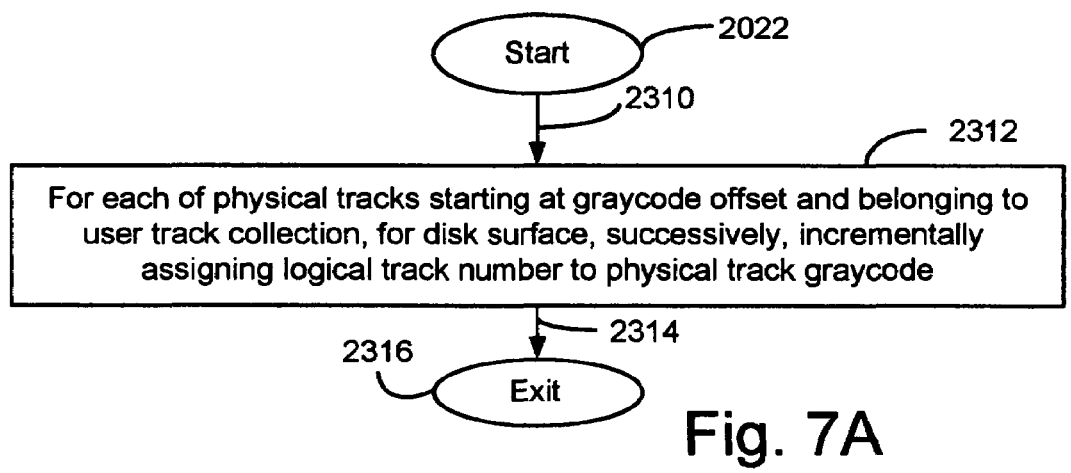
FIG. 7A illustrates a flowchart for a preferred method of successively assigning consecutive logical track numbers to the physical tracks on the disk surface.

FIG. 7A illustrates process block 2022 of FIG. 4. Process block 2312 performs for each of the physical tracks starting at the graycode offset and belonging to the user track collection, for the disk surface, successively, incrementally assigning the logical track number to the physical track graycode.

In a serpentine scheme as shown in FIGS. 3B and 3C, only one disk surface need have a maintenance collection of physical tracks. In the mapping scheme of FIG. 3D, it is preferable for each disk surface to have maintenance and user data collections of physical tracks.

Figure 7B:
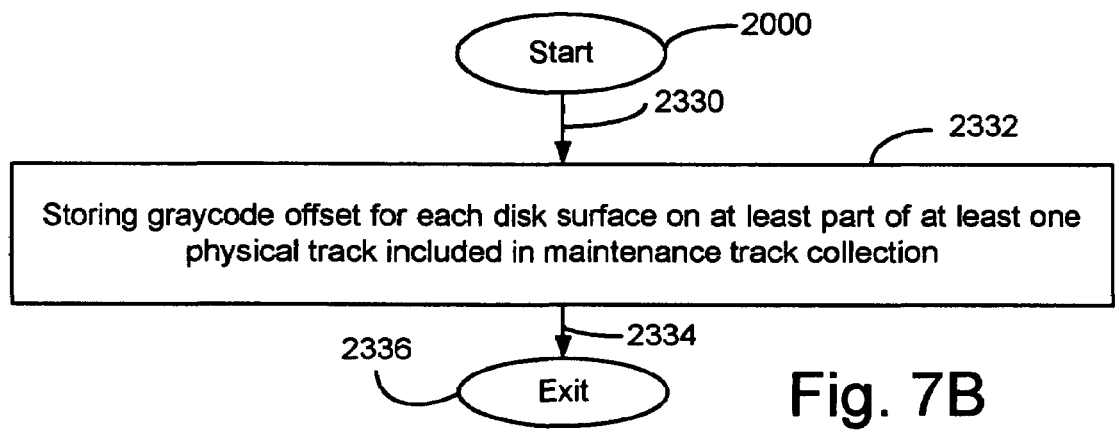
FIG. 7B illustrates a flowchart of a preferred method for storing the graycode offset for each of the disk surfaces on at least part of at least one the physical tracks included in the maintenance track collection.

FIG. 7B illustrates program system 2000 of FIG. 4 further storing the graycode offset for each disk surface on at least part of at least one physical track included in the maintenance track collection, as process block 2332.

As one skilled in the art will recognize, the physical track storing the graycode offsets in the maintenance track collection preferably is separated from the user data track collection members to minimize the risk of accidental erasure.

If a disk surface allocates certain physical tracks as unused, or unusable, they will be considered as part of the maintenance track collection. Such physical tracks include, but are not limited to, physical tracks located near OD affected by the Crash Stop 90.

Other invention implementations may collect unused and/or unusable physical tracks into other collections. As used herein, a disk surface whose physical tracks consist essentially of members of the maintenance track collection and members of the user track collection refers to these variations regarding unused and/or unusable physical tracks.

The user track collection is "below" the disk management system of an operating system such as Unix or Linux. A single user track collection may include partitions for more than one logical device and more than one operating system. The user track collection may include physical tracks holding the disk partition tables as well.

Figure 7C:
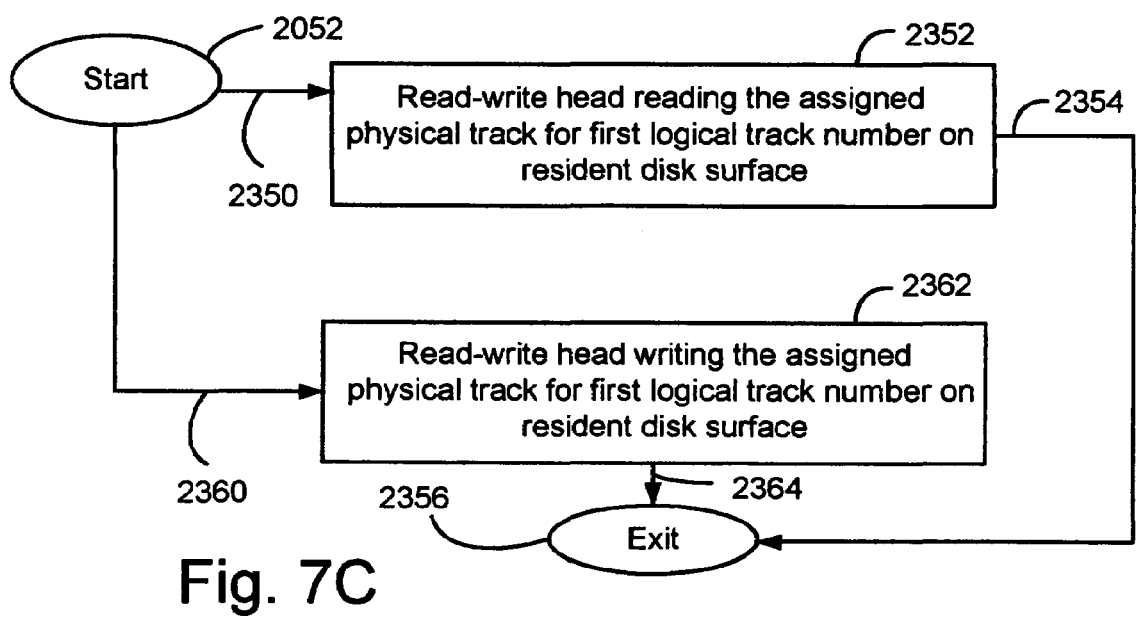
FIG. 7C illustrates a flowchart of a read-write head accessing the assigned physical track on a resident disk surface.

FIG. 7C illustrates process block 2052 of FIG. 4. Process block 2352 performs the read-write head reading the assigned physical track of the resident disk surface. Process block 2362 performs the read-write head writing the assigned physical track of the resident disk surface.

Figure 8A:
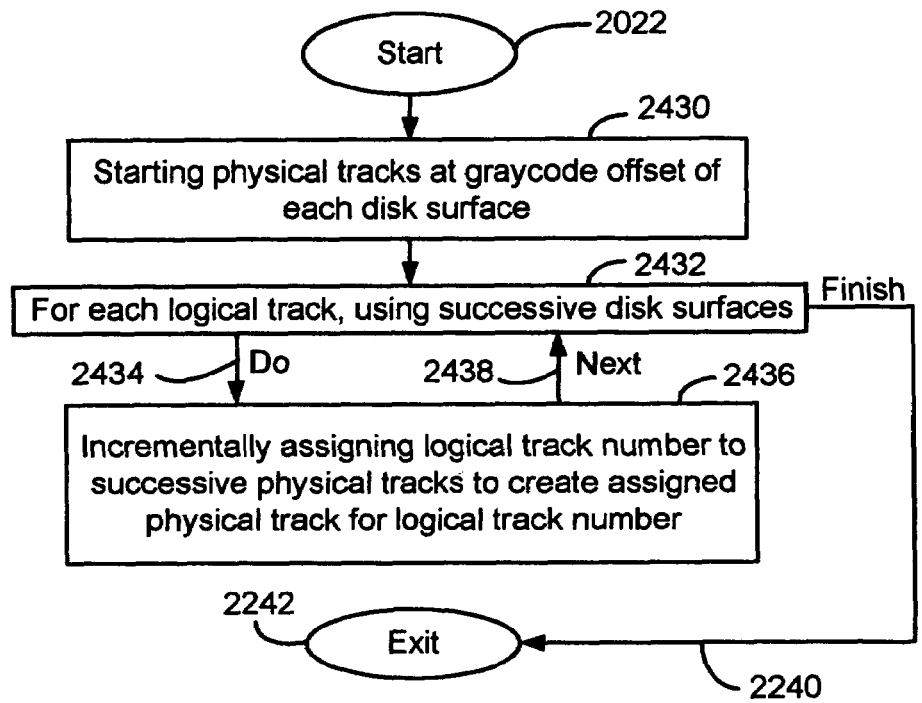
FIG. 8A illustrates a flowchart of a preferred method for successively assigning consecutive logical track numbers successively for each of the disk surfaces at successive physical tracks.

FIG. 8A illustrates process block 2022 of FIG. 4 assigning consecutive logical track numbers successively for each disk surface at successive physical tracks as in FIG. 3D. Process block 2430 starts the physical tracks at the graycode offset of the read-write head accessing the disk surface, for each disk surface. Process block 2432 controls iteration of process block 2436, for each logical track number using successive disk surfaces. When the iterations are finished, the process is terminated. Process block 2436 is the body of the loop, incrementally assigning logical track number to physical track on the disk surface in use, to create the assigned physical track on the disk surface, for the logical track number.

Figure 8B:
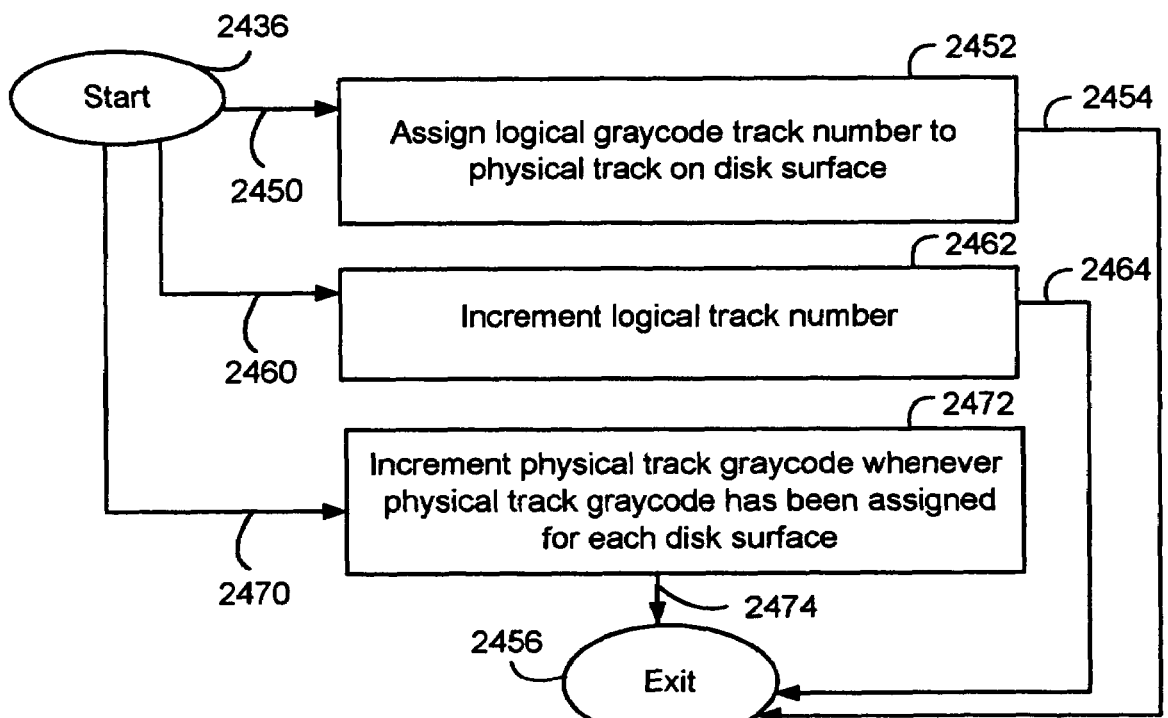
FIG. 8B illustrates a flowchart of a preferred method for incrementally assigning the logical track number to the physical track on the disk surface in use.

FIG. 8B illustrates process block 2436 of FIG. 8A. Process block 2452 assigns the logical track number to the physical track on the disk surface. Process block 2462 increments the logical track number. Process block 2472 increments the physical track whenever the physical track has been assigned for each of the disk surfaces. Incrementing the physical track is done for each of the disk surfaces.

Mechanical shocks can affect read-write head alignment, as well as their relative position to each other. Disk drive performance after receiving one or more shocks may depend on how much the read-write heads shift relative to each other, and how much read-write head skew margin, the firmware allows. This allowance is based upon when the active read-write head switches from one active read-write head to another.

The serpentine scheme of FIGS. 3B and 3C is more tolerant because read-write heads switch only at the end of a zone, which could be after accessing all the user data tracks on a disk surface.

The preceding embodiments have been provided by way of example and are not meant to constrain the scope of the following claims.

The invention claimed is:

1. A disk drive, comprising:
   a computer controlled by a program system including program steps residing in an accessibly coupled memory;
   a collection of physical tracks on at least two disk surfaces;
   wherein said disk drive maps a collection of logical track numbers to said collection of said physical tracks on said at least two disk surfaces;
   wherein said program system is comprised of the program steps of:
   determining a graycode offset for a read-write head accessing said disk surface, for each of said disk surfaces included in said disk drive;
   successively assigning said logical track numbers successively for each of said disk surfaces starting at said graycode offset for said read-write head accessing said disk surface to create an assigned physical track for said logical track number;
   determining a resident disk surface of a first of said logical track numbers as a first logical track number;
   determining said assigned physical track for said first logical track number; and
   said read-write head accessing said assigned physical track for said first logical track number of said resident disk surface;
   wherein for each of said disk surfaces, each of said physical tracks on said disk surface contains a unique graycode, and whenever two of said physical tracks are physically neighbors, the hamming distance between said graycodes of said two physical tracks is one.

2. The disk drive of claim 1,
   wherein the program step determining said graycode offset is further comprised of the program steps of:
   assigning an initial graycode offset to a first of said disk surfaces; and
   deriving said graycode offset for each of said disk surfaces other than said first disk surface.

3. The disk drive of claim 2,
wherein the program step deriving said graycode offset is further comprised, for each of said disk surfaces other than said first disk surface, of the program step of:
repeatedly reading a nearest of said physical tracks on said disk surface by said read-write head accessing said disk surface to create an average graycode offset for said disk surface;
wherein said average graycode offset at least partially determines said graycode offset for said read-write head accessing said disk surface, for each of said disk surfaces other than said first disk surface.

4. The disk drive of claim 3,
wherein the program step deriving said graycode offset is further comprised, for said disk surface other than said first disk surface, of the program step of:
rounding said average graycode offset to the nearest integer to create said graycode offset for said disk surface.

5. The disk drive of claim 1,
wherein the program step successively assigning said logical track numbers successively, is further comprised of the program steps of:
starting said physical tracks at said graycode offset of said read-write head accessing said disk surface, for each of said disk surfaces; incrementally assigning said logical track number, for each of said logical track numbers successively using said disk surfaces, is further comprised of the program steps of:
assigning said logical track number to said physical track on said disk surface;
incrementing said logical track number; and
incrementing said physical track whenever said physical track has been assigned for each of said disk surfaces.

6. The disk drive of claim 1,
wherein each of said physical tracks on each of said disk surfaces consists essentially of a maintenance track collection and a user track collection;
wherein said maintenance track collection shares no member with said user track collection;
wherein said maintenance track collection includes at least one physical track and said user track collection includes at least two of said physical tracks;
wherein for each of said disk surfaces, the program step for each of said disk surfaces, incrementally assigning said logical track number, is further comprised of the program steps of:
for each of said disk surfaces, incrementally assigning said logical track number to successive physical tracks starting at said graycode offset and belonging to said user data collection, for said disk surface to create said assigned physical track for said logical track number.

7. The disk drive of claim 6, further comprising the program step of:
storing said graycode offset for each of said disk surfaces on at least part of at least one of said physical tracks included in said maintenance track collection.

8. The disk drive of claim 1,
wherein the program step of said read-write head accessing said assigned physical track for said first logical track number is further comprised of the program steps of:
said read-write head reading said assigned physical track for said first logical track number on said resident disk surface; and
said read-write head writing said assigned physical track for said first logical track number on said resident disk surface.

9. A method of mapping a collection of logical track numbers to a collection of physical tracks on at least two disk surfaces within a disk drive,
wherein for each of said disk surfaces, each of said physical tracks on said disk surface contains a unique graycode, and whenever two of said physical tracks are physically neighbors, the hamming distance between said unique graycodes of said two physical tracks is one;
said method comprising the steps of:
determining a graycode offset for a read-write head accessing said disk surface, for each of said disk surfaces within said disk drive; and
successively assigning said logical track numbers successively for each of said disk surfaces starting at said graycode offset for said read-write head accessing said disk surface to create an assigned physical track for said logical track number.

10. The method of claim 9,
wherein the step determining said graycode offset is further comprised of the steps of:
assigning an initial graycode offset to a first of said disk surfaces; and
deriving said graycode offset for each of said disk surfaces other than said first disk surface.

11. The method of claim 10,
wherein the step deriving said graycode offset is further comprised, for each of said disk surfaces other than said first disk surface, of the step of:
repeatedly reading a nearest of said physical tracks on said disk surface by said read-write head accessing said disk surface to create an average graycode offset for said disk surface;
wherein said average graycode offset at least partially determines said graycode offset for said read-write head accessing said disk surface, for each of said disk surfaces other than said first disk surface.

12. The method of claim 11,
wherein the step deriving said graycode offset is further comprised, for said disk surfaces other than said first disk surface, of the step of:
rounding said average graycode offset to the nearest integer to create said graycode offset for said disk surface.

13. The method of claim 9,
wherein the step successively assigning said logical track numbers successively for each of said disk surfaces, is further comprised of the steps of:
start said physical tracks at said graycode offset of said read-write head accessing said disk surface, for each of said disk surfaces;
for each of said logical track numbers successively using said disk surface, incrementally assign said logical track number to successive of said physical tracks to create said assigned physical track for said logical track number, further comprising the steps of:
assign said logical track number to said physical track on said disk surface;
increment said logical track number; and
increment said physical track whenever said physical track has been assigned for each of said disk surfaces.

14. The method of claim 13,
wherein each of said physical tracks on each of said disk surfaces consists essentially of a maintenance track collection and a user track collection;
wherein said maintenance track collection shares no member with said user track collection;
wherein said maintenance track collection includes at least one physical track and said user track collection includes at least two tracks;
wherein for each of said disk surfaces, the step for each of said disk surfaces, incrementally assign said logical track number, is further comprised of the steps of:
for each of said disk surfaces, incrementally assign said logical track number to successive physical tracks starting at said graycode offset and belonging to said user data collection, for said disk surface to create said assigned physical track for said logical track number.

15. The method of claim 14, further comprising the step of:
storing said graycode offset for each of said disk surfaces on at least part of at least one of said physical tracks included in said maintenance track collection.

16. A method for accessing said logical track number of said disk drive of claim 9, comprising the steps of:
determining a resident disk surface of said logical track number;
determining said assigned physical track for said logical track number; and
said read-write head accessing said assigned physical track of said resident disk surface.

17. The method of claim 16,
wherein the step of said read-write head accessing said assigned physical track of said resident disk surface is further comprised of the steps of:
said read-write head reading said assigned physical track of said resident disk surface; and
said read-write head writing said assigned physical track of said resident disk surface.

18. A method of manufacturing said disk drive of claim 9, comprising the steps of:
determining said graycode offset for said read-write head accessing said disk surface, for each of said disk surfaces within said disk drive; and
successively assigning said logical track numbers successively for each of said disk surfaces starting at said graycode offset for said read-write head accessing said disk surface to create said assigned physical track for said logical track number.

19. The disk drive as a product of the manufacturing process of claim 18.

20. A program system implementing the steps of the method of claim 9 as program steps residing in a memory accessibly coupled to a computer controlling said read-write heads in said disk drive;
wherein said program system, comprises the program steps of:
determining said graycode offset for said read-write head accessing said disk surface, for each of said disk surfaces within said disk drive; and
successively assigning said logical track numbers successively for each of said disk surfaces starting at said graycode offset for said read-write head accessing said disk surface to create said assigned physical track for said logical track number.

21. A disk drive implementing the method of claim 9, comprising:
means for determining said graycode offset for said read-write head accessing said disk surface, for each of said disk surfaces within said disk drive; and
means for successively assigning consecutive logical track numbers at successive physical tracks starting at said graycode offset for said read-write head accessing said disk surface, successively for each of said disk surfaces.

* * * * *